United States Patent [19]
Baba et al.

[11] 3,808,349
[45] Apr. 30, 1974

[54] BEAT INDICATOR FOR AN AUTOMATIC RHYTHM INSTRUMENT

[75] Inventors: Kenji Baba; Masaya Nakajima, both of Osaka, Japan

[73] Assignee: Matsushita Electric Industrial Co. Ltd., Kadoma, Osaka, Japan

[22] Filed: June 15, 1972

[21] Appl. No.: 263,279

[30] Foreign Application Priority Data
June 18, 1971 Japan................ 46-44308

[52] U.S. Cl. ............................................. 84/484
[51] Int. Cl. .......................................... G10b 3/22
[58] Field of Search......... 84/1.03, 464, 477 R, 484; 315/132, 133, 185, 299, 300, 363

[56] References Cited
UNITED STATES PATENTS

| | | | |
|---|---|---|---|
| 3,541,916 | 11/1970 | Reid | 84/484 |
| 3,490,458 | 1/1970 | Allison | 84/464 X |
| 3,540,343 | 11/1970 | Rifkin | 84/464 |
| 3,635,121 | 1/1972 | Knauff | 84/464 |
| 3,215,022 | 11/1965 | Orgo | 84/464 |
| 3,222,574 | 12/1965 | Silvestri | 84/464 X |
| 3,550,497 | 12/1970 | Marsh | 84/464 |

Primary Examiner—Richard B. Wilkinson
Assistant Examiner—Stanley J. Witkowski
Attorney, Agent, or Firm—Wenderoth, Lind & Ponack

[57] ABSTRACT

A beat indicator for an automatic rhythm instrument comprises a switching circuit, an indicating lamp which is switched on by the switching circuit, and a circuit for changing the brightness of the indicating lamp according to a pulse train from a pulse generator of the automatic rhythm instrument.

8 Claims, 4 Drawing Figures 3,808,349

BEAT INDICATOR FOR AN AUTOMATIC RHYTHM INSTRUMENT

BACKGROUND OF THE INVENTION

This invention relates to a tempo indicator for an automatic rhythm instrument, and especially to a tempo indicator which has a simple structure and is convenient for a player to tune precisely to the tempo of a rhythm.

It is well known that an automatic rhythm instrument produces various types of rhythm by actuating various sound circuits through selector switches according to pulse trains provided from pulse generating means which is capable of varying the pulse frequency.

Conventionally, the tempo of a rhythm of an automatic rhythm instrument is perceived by means of a tempo indicator which glimmers only once for each measure of a rhythm coinciding in time with the first beat of each measure of the rhythm, or which glimmers at the time of every beat of each measure of a rhythm with a uniform intensity. Such a conventional tempo indicator is composed of a monostable multivibrator, which is actuated at the first beat of each measure of a rhythm, and an indicator which is operated by the multivibrator and accordingly indicates the first beat. In order to indicate every beat of each measure of the rhythm, it is necessary to use a plurality of monostable multivibrators which are triggered by the pulse trains from the pulse generating means and a plurality of indicators for indicating each beat of each measure of the rhythm, respectively.

However, in case of the former when only the first beat is indicated, there is a defect in that it is difficult for a player to get a precise indication of the tempo of the rhythm. Further, in case of the latter, the structure of the tempo indicating device becomes very complicated and not practical. Therefore, it has been desired to develop a tempo indicator for an automatic rhythm instrument, which can indicate precisely with a single indicator not only the first beat, but also every beat of each measure of the rhythm with a different indication from that of the first beat, so as to make it convenient and comfortable for a player to use the automatic rhythm instrument with any musical instrument.

BRIEF SUMMARY OF THE INVENTION

Accordingly, an object of the present invention is to provide such a tempo indicator for an automatic rhythm instrument which indicates precisely not only the tempo of a rhythm but also the particularly emphasized beat of a measure, for example the first beat.

It is another object of this invention to provide a tempo indicator which has a relatively simple structure comprising simple switching circuits and a single indicator capable of indicating both the tempo and the emphasized beat.

DETAILED DESCRIPTION OF THE INVENTION

These objects are achieved by a beat indicator according to the present invention adapted for an automatic rhythm instrument and which is capable of producing a first pulse train corresponding to every beat of a rhythm and a second pulse train corresponding to a previously appointed beat of each measure of the rhythm. The indicator comprises a series circuit of switching means which is actuated according to the first pulse train, indicating means the indicating intensity of which changes with a change in electric current flowing therethrough, and control means which is actuated according to the second pulse train so as to control electric current flowing through the indicating means.

Other objects, features and advantages of this invention will become apparent from the following description taken in conjunction with the accompanying drawings in which:

FIG. 1 is a block diagram illustrating an example of the beat indicator of this invention with an automatic rhythm instrument.

FIG. 2 is a circuit diagram schematically illustrating one embodiment of the beat indicator of this invention.

FIG. 3 is a timing chart explaining the operation of the beat indicator of this invention for various rhythms.

FIG. 4 is a circuit diagram similar to that of FIG. 2 in which the monostable multivibrator in FIG. 2 is replaced by a Schmitt circuit.

Figure 1:
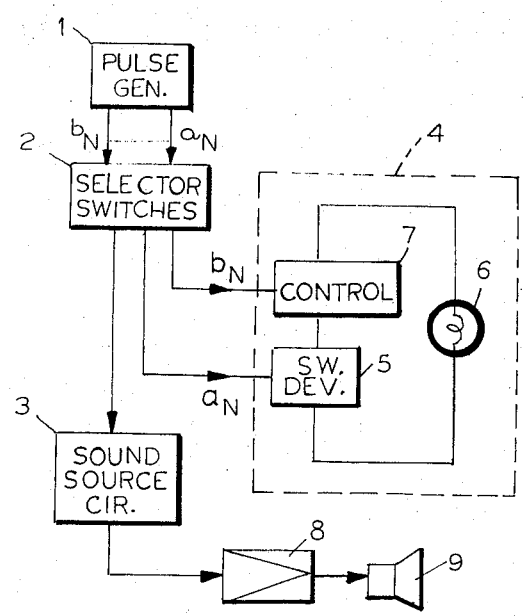
In FIG. 1, a reference numeral 1 designates pulse generating means which produces pulse trains corresponding to every beat of a rhythm, $a_N$ and a pulse train corresponding to a previously appointed beat, $b_N$, for example, the first beat of each measure. These pulse trains are supplied to a tempo indicator 4 through selector switches 2. The tempo indicator 4 comprises a switching device 5, an indicating means 6 and control means 7. The indicating means 6 is switched on or off by the switching device 5 which is actuated by the foregoing pulse train $a_N$ and the indicating means 1 is caused to glimmer corresponding to every beat of a rhythm. The pulse train $b_N$ actuates the control means 7 which controls current flowing through the indicating means 6. Therefore, the indication given by the indicator means 6 for a previously appointed beat of each measure of a rhythm is changed to a different intensity from that of the other beats of each measure of the rhythm.

The other block 3, 8 and 9 shown in FIG. 1 designate various sound source circuits, an amplifier and a speaker, respectively, which form a conventional automatic rhythm instrument with the pulse generating means 1 and the selector switches 2. A description of the automatic rhythm instrument is omitted because it is well known and it is not the subject matter of the present invention.

The pulse generating means 1 is a device which is capable of generating pulses at different pulse frequencies and produces desired combinations of pulses, for example, by arranging output pulses from a common binary counter coupled to a voltage-controlled oscillator by means of a diode logic matrix and programing circuits.

Figure 2:
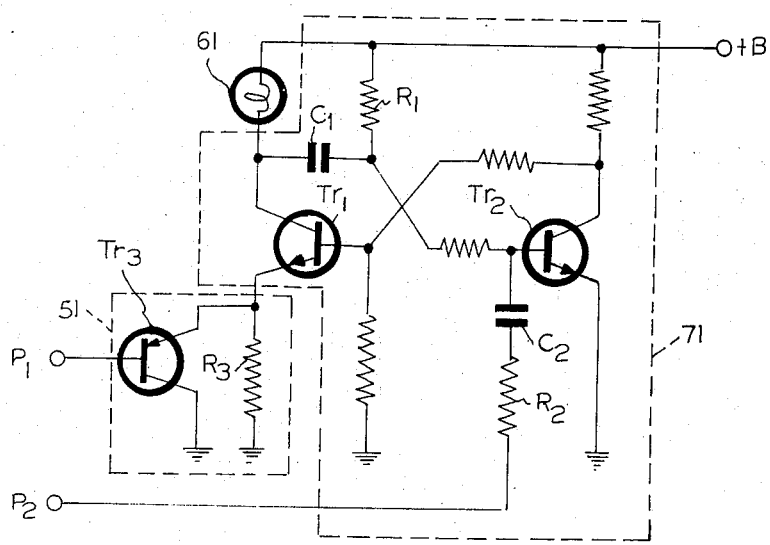

FIG. 2 shows a means 5. diagram of one embodiment of the tempo indicator of the invention which comprises a monostable multivibrator 71 for the switching device 7 shown in FIG. 1, a lamp 61 for the indicating means 6, and a parallel circuit 51 of a transistor $Tr_3$ and a resistor $R_3$ for the control means5. The transistor $Tr_3$ controls the current flowing through the lamp 61.

The lamp 61 is connected between a power supply (+B ) and the collector of a transistor $Tr_1$ of the monostable multivibrator 71. The transistor $Tr_1$ is not conductive in a stable state. The collector and the emitter of the transistor $Tr_3$ are connected in parallel to the resistor $R_3$ which is connected between the emitter of the transistor $Tr_3$ and the ground.

The pulse train $a_N$ from the pulse generating means 1 through the selector switches, shown in FIG. 1 is applied through terminal $P_2$ to the base of a transistor $Tr_2$, which is conductive in the stable state, of the monostable multivibrator 71, as a negative triggering signal. Then, the monostable multivibrator carries out on and off action according to the pulse train $a_N$ and the lamp 61 glimmers corresponding to every beat of each measure of a rhythm.

On the other hand, the pulse train $b_N$ corresponding to a previously appointed beat, for example, the first beat, is applied to the base of the transistor $Tr_3$ through a terminal $P_1$, and it makes the transistor $Tr_3$ conductive at the time of the first beat. Then, the resistor $R_3$ is short-circuted by the transistor $Tr_3$, and consequently, the electric current through the lamp 51 is increased. Therefore, intensity of illumination of the lamp 51 is increased corresponding to the first beat of each measure of the rhythm.

Figure 3:
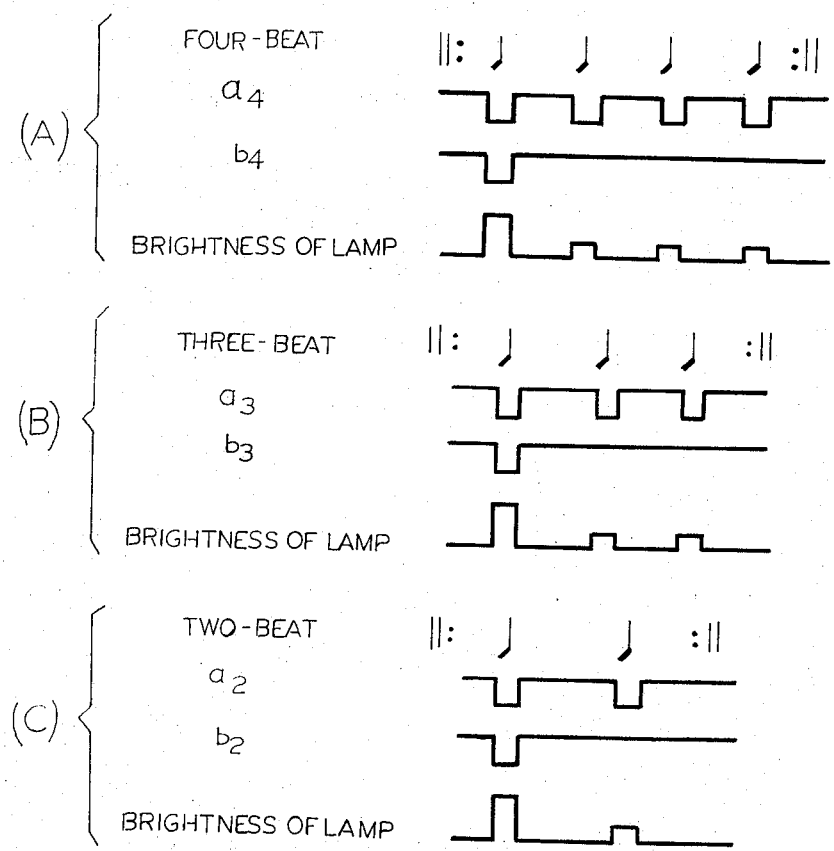

A time relation of the aforesaid pulse trains of various rhythms is shown in FIG. 3. For example, in the case of a four-beat rhythm, pulse trains $a_4$ and $b_4$ as shown in the figure are applied through the selector switches 2 shown in FIG. 1 to the terminals $P_2$ and $P_1$, respectively. Then, the transistor $Tr_3$ is made conductive by the pulse train $b_4$ at the first beat of each measure of the rhythm and is cut-off at the other beats because no pulse is present in the pulse train, so that the lamp 61 glimmers more brightly at the first beat than at the second, third and fourth beats of each measure of the rhythm.

For a three-beat rhythm or a two-beat rhythm, a similar, operation is provided as obvious from FIG. 3 by a combination of the pulse trains $a_3$ and $b_3$ or $a_2$ and $b_2$, respectively.

According to the tempo indicator of the invention as described above, there is the advantage that the time the lamp 61 is illuminated can be adjusted by changing the time constant of a capacitor $c_1$ and a resistor $R_1$ in the monostable multivibrator 71, independently of the tempo of the rhythm.

Further, by using a monostable multivibrator, there is the advantage that the time the lamp 61 is illuminated can be set to be constant independently from the beat rhythm.

Figure 4:
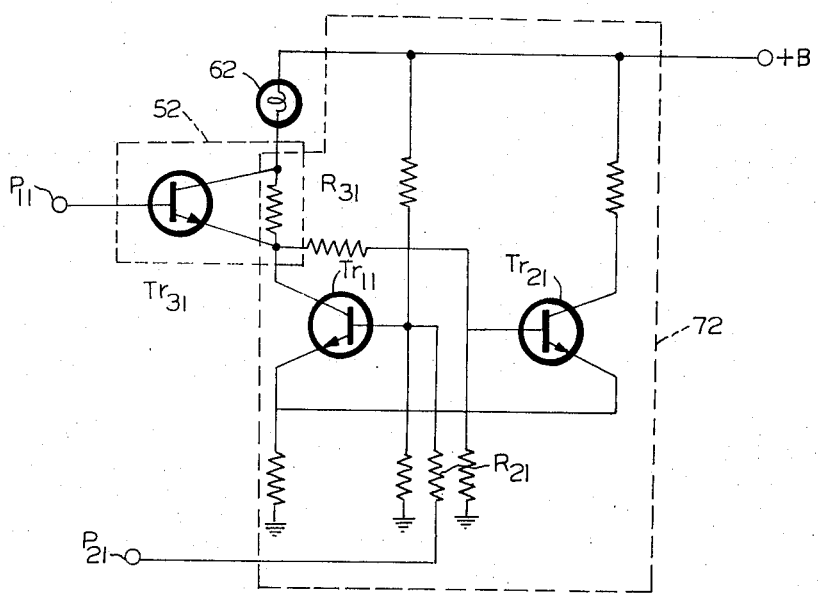

It is advantageous to use a Schmitt circuit, which has high stability with respect to disturbance such as noise or spurious pulses, for the switching device 7 instead of the monostable multivibrator 71 for providing a more stable operation of the tempo indicator of the invention. FIG. 4 is a circuit diagram of another embodiment of the tempo indicator of the invention which comprises a Schmitt circuit 72 for the switching device 7 shown in FIG. 1, a lamp 62 for the indicating means 6 and a parallel connection 52 of a transistor $Tr_{31}$ and a resistor $R_{31}$ for the control means 5. The lamp 62 is connected between a power supply (+B) and a collector of the transistor $Tr_{31}$ and the resistor $R_{31}$. The collector and an emitter of the transistor $Tr_{31}$ are connected in parallel to the resistor $R_{31}$ which is connected between the lamp 62 and the collector of a transistor $Tr_{11}$ of the Schmitt circuit 72. The transistor $Tr_{11}$ and $Tr_{31}$ are not conductive in a stable state.

The aforesaid pulse train $a_N$ being applied at a terminal $P_{21}$ and pulse train $b_N$ being applied at a terminal $P_{11}$ from the pulse generating means 1 through the selector switch 2, shown in FIG. 1, are applied to a base of the transistor $Tr_{11}$ through a resistor $R_{21}$ and the base of the transistor $Tr_{31}$, respectively. Then, the Schmitt circuit switches on and off according to the pulse train $a_N$. FUrthermore, according to the pulse train $b_N$, the transistor $Tr_{31}$ is short-circuited. Consequently, the lamp 62 glimmers corresponding to each beat of each measure of a rhythm and is brighter at the times of the pulses of pulse train $b_N$, for example at the first beat. In this case, the illuminating time of the lamp 62 is determined by the pulse width of the input pulse applied to the base of the transistor $Tr_{11}$.

Although the lamp 61 has been described as the indicating means 6 in the above embodiment, it is of course possible to use other illuminating means such as a light emitting diode, neon lamp, etc. or other means such as an indicating meter.

Also, for the control means 5, it is possible to use a transistor, the resistance of which is changed according to the pulse $b_N$ applied thereto, and consequently the electric current flowing through the indicating means 6 is changed.

While there have been described what at present are believed to be the preferred embodiments of this invention, it will be obvious that various changes and modifications can be made therein without departing from the spirit or scope of the invention.

What we claim is:

1. A beat indicator for an automatic rhythm instrument comprising pulse generating means for producing a first pulse train corresponding to every beat of a rhythm and a second pulse train corresponding to a previously appointed beat of each measure of the rhythm, and a tempo indicator comprising a series circuit comprised of switching means coupled to said first pulse train, indicating means the indicating intensity of which changes with a change in electric current flowing therethrough, and control means coupled to said pulse control generating means to be actuated according to said second pulse train so as to control electric current flowing rhrough said indicating means.

2. A beat indicator as claimed in claim 1, wherein said switching means is a monostable multivibrator.

3. A beat indicator as claimed in claim 1, wherein said switching means is a Schmitt circuit.

4. A beat indicator as claimed in claim 1, wherein said indicating means is a lamp.

5. A beat indicator as claimed in claim 1, wherein said control means is a parallel circuit of a resistor and a switch which is actuated according to said second pulse train.

6. A beat indicator as claimed in claim 5, wherein said switch is a transistor.

7. A beat indicator for an automatic rhythm instrument comprising pulse generating means for producing a first pulse train corresponding to every beat of a rhythm and a second pulse train corresponding to a previously appointed beat of each measure of the rhythm, and a tempo indicator comprising a series circuit of a monostable multivibrator coupled to said pulse generating means to be actuated according to said first pulse train, a lamp the illuminating intensity of which changes with a change in electric current flowing therethrough, and a parallel connection of a resistor and a transistor coupled to said pulse generating means to be actuated according to said second pulse train so as to control the current flowing through said lamp.

8. A beat indicator for an automatic rhythm instrument comprising pulse generating means for producing a first pulse train corresponding to every beat of a rhythm and a second pulse train corresponding to a previously appointed beat of each measure of the rhythm, and a tempo indicator comprising a series circuit of a Schmitt circuit coupled to said pulse generating means to be actuated according to said first pulse train, a lamp the illuminating intensity of which changes with a change in eleectric current flowing therethrough, and a parallel connection of a resistor and a transistor coupled to said pulse generating means to be actuated according to said second pulse train so as to control the current flowing through said lamp.

* * * * *